(12) United States Patent
Lee et al.

(10) Patent No.: US 7,710,527 B2
(45) Date of Patent: May 4, 2010

(54) THIN FILM TRANSISTORS SUBSTRATE AND LIQUID CRYSTAL DISPLAY HAVING THE SAME

(75) Inventors: Hong Woo Lee, Cheonan-Si (KR); Jong Hwan Lee, Anyang-Si (KR); Sang Youn Han, Cheonan-Si (KR); Sung Man Kim, Seoul (KR); Yeon Kyu Moon, Gunpo-Si (KR)

(73) Assignee: Samsung Electronics Co., Ltd. (KR)

( * ) Notice: Subject to any disclaimer, the term of this patent is extended or adjusted under 35 U.S.C. 154(b) by 162 days.

(21) Appl. No.: 11/933,184

(22) Filed: Oct. 31, 2007

(65) Prior Publication Data

US 2008/0192163 A1    Aug. 14, 2008

(30) Foreign Application Priority Data

Feb. 13, 2007   (KR) ..................... 10-2007-0014944

(51) Int. Cl.
*G02F 1/1343*   (2006.01)
*G02F 1/1345*   (2006.01)

(52) U.S. Cl. ...................................... 349/143; 349/149
(58) Field of Classification Search ................. 349/143, 349/149
See application file for complete search history.

(56) References Cited

U.S. PATENT DOCUMENTS

| 5,757,444 A * | 5/1998 | Takemura ..................... 349/38 |
| 2005/0078240 A1* | 4/2005 | Murade ....................... 349/110 |

* cited by examiner

*Primary Examiner*—Jerry T Rahll
(74) *Attorney, Agent, or Firm*—Cantor Colburn LLP

(57) ABSTRACT

A thin film transistor substrate includes; a substrate, a plurality of gate lines disposed on the substrate, a plurality of data lines disposed substantially perpendicular to the gate lines, wherein the plurality of data liens include a plurality of outermost data lines, a plurality of thin film transistors ("TFTs") connected to the gate and data lines, a plurality of pixel electrodes connected to the plurality of TFTs, and a plurality of dummy patterns connected to the outermost data lines.

23 Claims, 7 Drawing Sheets

THIN FILM TRANSISTORS SUBSTRATE AND LIQUID CRYSTAL DISPLAY HAVING THE SAME

This application claims priority to Korean Patent application No. 10-2007-0014944, filed on Feb. 13, 2007, and all the benefits accruing therefrom under 35 U.S.C. §119, the contents of which in its entirety are herein incorporated by reference.

BACKGROUND OF THE INVENTION

1. Field of the Invention

The present invention relates to a thin film transistor substrate and a liquid crystal display having the same, and more particularly, to a thin film transistor substrate with dummy patterns formed outside the outermost data lines to compensate for a charging rate and a liquid crystal display having the thin film transistor substrate.

2. Description of the Related Art

A liquid crystal display ("LCD") includes a thin film transistor ("TFT") substrate with pixel electrodes formed thereon, a color filter substrate with a common electrode formed thereon, and a liquid crystal layer interposed between the TFT and color filter substrates. In the LCD, an electric field is produced in the liquid crystal display by applying voltage to the pixel and common electrodes. The applied electric field controls the orientation of liquid crystal molecules in the liquid crystal layer and the orientation of the liquid crystal molecules in the liquid crystal layer thereby controls the polarization of incident light. Typically, LCD displays include a plurality of pixels, each pixel capable of independently controlling the amount of incident light passing therethrough.

Gate and data lines for transmitting scanning and image signals, respectively, extend substantially perpendicular to each other, on the TFT substrate. Each pixel of the LCD is connected to at least one data line and at least one gate line and each pixel occupies a pixel region. A TFT and a pixel electrode are formed in each pixel region. The TFT is connected to the gate and data lines, and the pixel electrode is connected to the TFT. Here, the TFT is a switching element allowing an image signal transmitted through the data line to be transmitted to the pixel electrode or cut off depending on the state of a scanning signal transmitted through the gate line.

Moving images may be shown by rapidly displaying a series of slightly changing images. Each image in the series is called a frame.

As the resolution and sized of LCDs have increased the requirement for lightweight, thin and small-sized components for the LCD has also increased. In order to implement a high resolution display, the number of pixels, and therefore also the number of data and gate lines, is essentially increased. Particularly, if the number of data lines is increased, the number of data driving integrated circuits ("ICs") for applying image signals to the data lines is also increased. Therefore, the size of an LCD enlarges.

An LCD with a reduced number of data driving ICs has been suggested to reduce the size of the LCD while maintaining a high resolution. In this case, the number of gate driving ICs should be increased instead; therefore a Gate IC Integration ("GII") method of integrating gate driving ICs in a panel is generally applied at the same time. Further, in order to effectively arrange the gate lines in increasing numbers, pixels are arranged in an abscissa (or x-axis) direction. Charging time for each frame in such an LCD display is insufficient for fully charging a data voltage from the data line to a corresponding pixel electrode. Therefore, a line reversal method, wherein each data line is driven at a voltage substantially opposite a common voltage, is used to compensate for the slower charging time. Further, in order to implement a pixel reversal while maintaining a line reversal method, TFTs connected to each data line may be arranged alternately left to right along the respective data line, thereby forming a zigzag pattern.

After TFTs are arranged alternately right and left in a zigzag pattern with respect to a data line, another data line may be added at each outermost side thereof. As such, each outermost data line is connected to half as many pixels as other respective data lines. For example, the leftmost data line is connected to the pixels only at the right side thereof, and the rightmost data line is connected to the pixels only at the left side thereof. Thus, the outermost data line differs from the other data lines in a capacitance between gate and drain electrodes. Accordingly, since the capacitance of the outermost data line is smaller than that of the other data lines, the charging rate of the pixels connected to the outermost data line is higher than that of the pixels connected to the other data lines.

Further, since there are only approximately half the pixels connected to each outermost data line as those connected to each of the other data lines, liquid crystal capacitors Clc and storage capacitors Cst of the pixels connected to the outermost data line are approximately half as large as those connected to the other respective data lines. Thus, the charging rate of the pixels connected to the outermost data lines is higher than that of the pixels connected to the other data line.

Since the charging rate of pixels connected to such an outermost data line is higher than that of pixels connected to other data lines, a display failure such as wrinkling stripes appears along the left and right sides of a panel. For example, a pixel with a display failure appears darker than adjacent pixels in a case of a twisted nematic ("TN") mode LCD, and appears brighter than adjacent pixels in a case of a patterned vertical alignment ("PVA") mode LCD.

BRIEF SUMMARY OF THE INVENTION

Aspects of the present invention include a thin film transistor ("TFT") substrate capable of minimizing a display failure, which occurs because the charging rate of pixels connected to outermost data lines is different from that of pixels connected to other data lines, and a liquid crystal display ("LCD") having the thin film transistor substrate.

According to an exemplary embodiment of the present invention, a TFT substrate includes; a substrate, a plurality of gate lines disposed on the substrate, a plurality of data lines disposed substantially perpendicular to the gate lines, a plurality of TFTs connected to the gate lines and the data lines, a plurality of pixel electrodes connected to the plurality of TFTs, and a plurality of dummy patterns connected to the outermost data lines.

In one exemplary embodiment the pixel electrode includes a first side substantially parallel with the gate line and a second side which is oblique or perpendicular to the gate line, wherein the first side is longer than the second side.

In one exemplary embodiment the dummy pattern includes; a lower electrode extending from the gate line, an insulation film disposed on the lower electrode, and an upper electrode disposed on the insulation film, wherein the upper electrode at least partially overlaps the lower electrode and extends from the outermost data line.

In one exemplary embodiment the dummy pattern comprises a dummy TFT and a dummy pixel electrode.

In one exemplary embodiment the dummy pattern may comprises a dummy storage electrode.

According to another exemplary embodiment of the present invention a TFT substrate includes; a substrate, a plurality of gate lines disposed on the substrate, a plurality of data lines disposed substantially perpendicular to the gate lines, wherein the plurality of data liens include a plurality of outermost data liens adjacent to only one other data line of the plurality of data lines, a plurality of TFTs, wherein a plurality of the TFTs is connected to each data line, and the TFTs are connected to alternating sides of the data lines along a length of the data lines, and each of the TFTs includes a gate electrode, a source electrode and a drain electrode, a plurality of pixel electrodes connected to the plurality of TFTs, and a plurality of dummy patterns connected to the outermost data lines.

In one exemplary embodiment the plurality of dummy patterns are connected to a side of the outermost data lines which is substantially opposite the side adjacent to another data line.

In one exemplary embodiment the dummy pattern includes; a lower electrode extending from the gate line, an insulation film disposed on the lower electrode, and an upper electrode disposed on the insulation film, wherein the upper electrode at least partially overlaps the lower electrode and extends from the outermost data line.

In one exemplary embodiment the lower electrode is substantially the same shape as the gate electrode, and the upper electrode is substantially the same shape as the source electrode.

In one exemplary embodiment the lower electrode is larger than the gate electrode, and the upper electrode is larger than the source electrodes.

In one exemplary embodiment the dummy pattern includes; a dummy gate electrode, a dummy gate insulation film and a dummy active layer disposed on the dummy gate electrode, a dummy source electrode disposed on the dummy active layer and at least partially overlapping the dummy gate electrode, a dummy drain electrode spaced apart from the dummy source electrode by a predetermined interval and at least partially overlapping the dummy gate electrode, a protection film including a contact hole which at least partially exposes the dummy drain electrode, and a dummy pixel electrode connected to the dummy drain electrode through the contact hole.

In one exemplary embodiment the dummy gate electrode has substantially the same shape as the gate electrode, and the dummy source electrode has substantially the same shape as the source electrode, and wherein the dummy drain electrode is smaller than the drain electrode, and the dummy pixel electrode is smaller than the pixel electrodes.

In one exemplary embodiment the dummy pattern includes; a dummy gate electrode and the dummy storage electrode spaced apart from each other by a predetermined interval, a dummy gate insulation film and a dummy active layer disposed on the dummy gate electrode, a dummy source electrode disposed on the dummy active layer and at least partially overlapping the dummy gate electrode, a dummy drain electrode spaced apart from the dummy source electrode by a predetermined interval and at least partially overlapping the dummy gate electrode, a protection film including a contact hole which at least partially exposes the dummy drain electrode, and a dummy pixel electrode connected to the dummy drain electrode through the contact hole.

In one exemplary embodiment the dummy gate electrode has substantially the same shape as the gate electrode, and the dummy source electrode has substantially the same shape as the source electrode, and wherein the dummy drain electrode is smaller than drain electrode, and the dummy pixel electrode is smaller than the pixel electrode.

According to a further aspect of the present invention, an exemplary embodiment of an LCD includes; a TFT substrate including; a substrate, a plurality of gate lines disposed on the substrate, a plurality of data lines disposed substantially perpendicular to the gate lines, wherein the plurality of data lines includes a plurality of outermost data lines adjacent to only one other data line of the plurality of data lines, a plurality of TFTs, wherein a plurality of the TFTs are connected to each data line, the TFTs are connected to alternating sides of the data lines along a length of the data lines, a plurality of pixel electrodes connected to the plurality of TFTs, and a plurality of dummy patterns connected to the outermost data lines in a zigzag pattern; a color filter substrate having a color filter and a common electrode corresponding to the TFT substrate, and a liquid crystal layer interposed between the TFT substrate and the color filter substrate.

According to another exemplary embodiment of the present invention a method for manufacturing a TFT substrate includes; providing a substrate, disposing a plurality of gate lines on the substrate, disposing a plurality of data lines substantially perpendicular to the gate lines on the substrate, wherein the plurality of data lines include a plurality of outermost data lines, connecting a plurality of thin film transistors to the gate lines and the data lines; connecting a plurality of pixel electrodes to the plurality of thin film transistors, and connecting a plurality of dummy patterns to the outermost data lines.

BRIEF DESCRIPTION OF THE DRAWINGS

Exemplary embodiments of the present invention can be understood in more detail from the following description taken in conjunction with the accompanying drawings, in which.

DETAILED DESCRIPTION OF THE INVENTION

Figure 1:
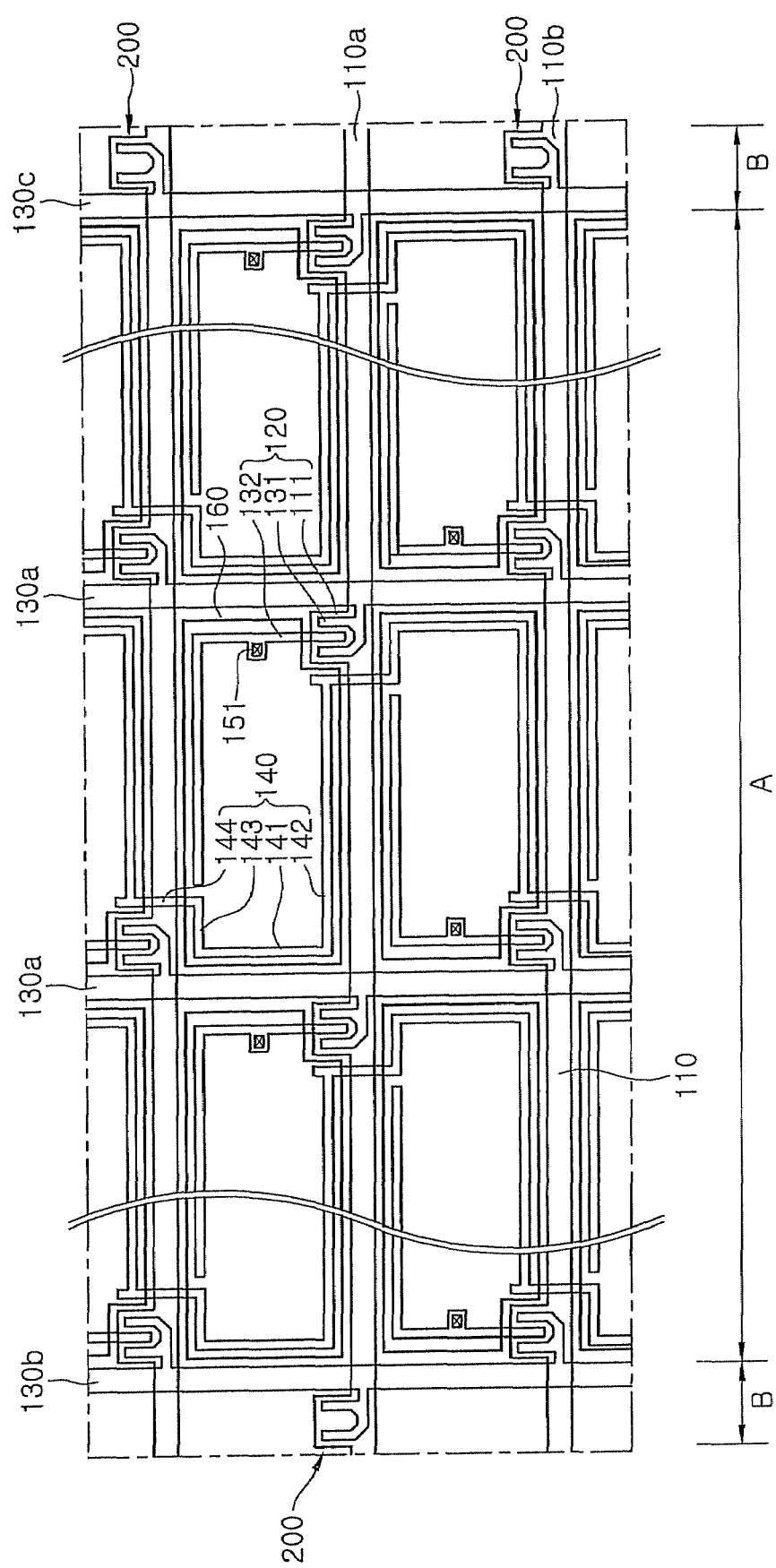
FIG. 1 is a top plan view layout of an exemplary embodiment of a thin film transistor ("TFT") substrate according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in detail with reference to the accompanying drawings.

Figure 2:
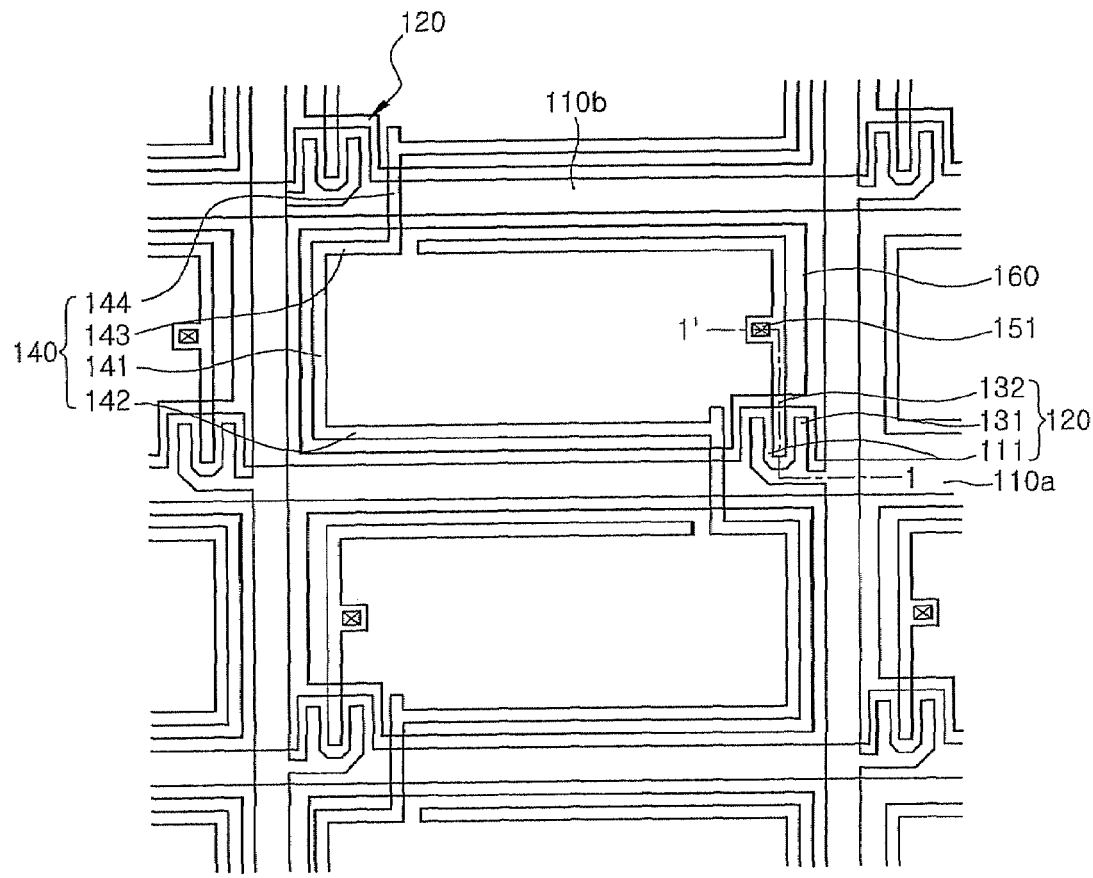
FIG. 2 is an enlarged top plan view layout of a cell region of the exemplary embodiment of a TFT substrate according to the present invention.
Figure 3:
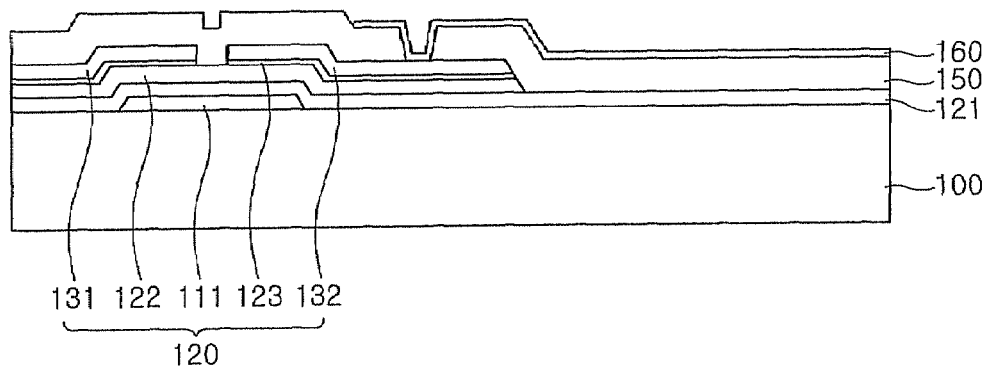
FIG. 3 is a cross-sectional view taken along line 1-1' of FIG. 2.

FIG. 1 is a top plan view layout of an exemplary embodiment of a thin film transistor ("TFT") substrate according to the present invention, FIG. 2 is an enlarged top plan view layout of a cell region of the exemplary embodiment of a TFT substrate of FIG. 1, and FIG. 3 is a cross-sectional view taken along line 1-1' of FIG. 2.

Referring to FIGS. 1 to 3, the TFT substrate according to the current exemplary embodiment of the present invention includes a plurality of gate lines 110 (including individual gate lines 110a and 110b) extending in a substantially horizontal direction; a plurality of data lines 130 (including individual data lines 130a, 130b and 130c) extending in a substantially vertical direction to intersect the gate lines 110; TFTs 120 arranged in a zigzag pattern left to right with respect to each of the data lines 130 at intersection positions of the gate lines 110 and the data lines 130; storage electrode portions 140 each including extension portions 141, 142 and 143, which extend substantially adjacent to the gate and data lines 110 and 130, and a connection portion 144; and pixel electrodes 160 formed to be respectively connected to the TFTs 120 in individual pixel regions and to overlap with the storage electrode portions 140. Furthermore, the TFT substrate also includes dummy patterns 200 respectively formed in dummy regions at outsides of the outermost data lines 130b and 130c. The dummy patterns 200 are electronic components added to the data and gate lines to mimic electrical properties of pixels in a display region of the display. The dummy patterns 200 will be described in more detail below. Meanwhile, in one exemplary embodiment the pixel region is defined to have a rectangular shape on a plane and to have a horizontal length longer than that of the vertical length.

Here, the data lines 130a, 130b and 130c will be described by being divided into the two outermost data lines 130b and 130c adjacent to the dummy regions and the other data lines 130a which exclude the two outermost data liens 130b and 130c. The gate lines 110 will be described by being divided into odd-numbered gate lines 110a and even-numbered gate lines 110b. Further, an inside region between the outermost data lines 130b and 130c is referred to as a cell region A, while an outside region of the outermost data lines 130b and 130c is referred to as a dummy region B.

The gate lines 110a and 110b are formed by patterning a first conductive layer to extend in the horizontal direction, with a portion of each gate line protruding therefrom to form a gate electrode 111 of the TFT 120. Further, in one exemplary embodiment gate drivers (not shown) for applying gate signals to the gate lines 110 are provided at both end regions thereof.

The gate lines 110 and the gate electrodes 111 a formed on a substrate 100, and a gate insulation film 121 is formed on top of the gate lines 110, the gate electrodes 111 and substantially the rest of the substrate 100 which is not covered by the gate lines 110. Exemplary embodiments of the gate insulation film 121 include a silicon oxide film or a silicon nitride film.

An active layer 122 which forms a channel portion of the TFT 120 is formed on top of the gate insulation film 121 disposed above the gate electrode 111. An ohmic contact layer 123 for reducing contact resistance is formed on top of the active layer 122. In one exemplary embodiment, an amorphous silicone layer is used as the active layer 122. In one exemplary embodiment an amorphous silicone layer doped with highly concentrated silicides or N-type impurities is used as the ohmic contact layer 123.

In one exemplary embodiment the data lines 130a, 130b and 130c are formed to extend in the direction vertically intersecting the gate lines 110 by patterning a second conductive layer. Further, a portion of the data line 130 extends onto the active layer 122 above the gate electrode 111 to form a source electrode 131, and a drain electrode 132 is formed substantially adjacent to the source electrode 131 on the active layer 122 above the gate electrode 111. The drain electrode 132 is formed to extend within the pixel region along a path which is first substantially parallel with the data and subsequently substantially parallel with the gate lines 130 and 110. Alternative exemplary embodiments include configurations wherein the gate lines 110 and the data lines 130 are formed by alternative means such as chemical vapor deposition ("CVD"), etc. Additionally, alternative exemplary embodiments include configurations wherein the drain electrode 132 extends along alternative paths, e.g., first extending substantially parallel to the gate line before extending substantially parallel to the data line.

At this time, the gate electrodes 111 along the odd-numbered gate line 110a are formed at the left sides of the data lines 130a and 130c, and are not formed at the left side of the data line 130b. In addition, the gate electrodes 111 along the even-numbered gate line 110b are formed at the right sides of the data lines 130a and 130b and are not formed at the right side of the data line 130c. That is, the gate electrodes 111 are formed at the right side of the data line 130b and are not formed at the left side thereof, while the gate electrodes 111 are formed at the left side of the data line 130c and are not formed at the right side thereof. The TFTs 120 along the odd-numbered gate lines are formed at the left sides of the data lines 130a and 130c, and are not formed at the left side of the data lines 130b. Meanwhile, the TFTs 120 along the even-numbered gate lines 110b are formed at the right sides of the data lines 130a and 130b, and are not formed at the right side of the data lines 130c. Thus, the TFTs 120 are arranged in a zigzag pattern between two adjacent data lines, e.g., between data lines 130a and 130b, between adjacent data lines 130a and 130a and between data lines 130a and 130c. That is, TFTs 120 are disposed alternately at the left and right sides of the data lines 130a along the length of the data line, so that the arrangement of the TFTs appears to be a zigzag pattern with respect to the data lines 130a.

In an alternate exemplary embodiment, the TFTs 120 along the even-numbered gate line 110b may be formed at the left sides of the data lines 130a and 130c, while not being formed at the left side of the data line 130b. In such an alternative exemplary embodiment the TFTs 120 along the odd-numbered gate line 110a may be formed at the right sides of the data lines 130a and 130b, while not being formed at the right side of the data line 130c.

The dummy pattern 200 is formed along the odd-numbered gate line 110a at the left side of the data line 130b in which the gate electrode 111 is not formed. A dummy pattern 200 is also formed in the even-numbered gate line 110b at the right side of the data line 130b in which the gate electrode 111 is not formed. The dummy patterns 200 are formed such that the charging rate of the data lines 130b and 130c in the dummy regions B are substantially identical with that of the data lines 130a in the cell region A.

In one exemplary embodiment the storage electrode portions 140 are formed substantially simultaneously with the data lines 130a, 130b and 130c by patterning the second conductive layer. Alternative exemplary embodiments include alternative methods of forming the storage electrode portions 140, including but not limited to CVD, etc. Each of the storage electrode portions 140 is formed along inner edges in each pixel region. The storage electrode portion 140 includes the first extension portion 141 formed on the gate insulation film 121 and extending substantially parallel to the data line 130, and the second and third extension portions 142 and 143 extending substantially in parallel to the gate line 110 from both ends of the first extension portion 141. Furthermore, the storage electrode portion 140 further includes the connection portion 144, which crosses the gate line 110 from the second extension portion 142 and is connected to the third extension portion 143 of the storage electrode portion 140 formed in an adjacent pixel region. Meanwhile, the physical properties, e.g., size and composition, of the storage electrode portion 140 may vary depending on a target capacitance of the storage capacitor. That is, since the capacitance of a storage capacitor is determined depending on the area of an overlapping region between the storage electrode portion 140 and the pixel electrode 160, the shape of the storage electrode portion 140 may be variously changed.

Meanwhile, exemplary embodiments of the gate line 110 may be formed of any one selected from the group consisting of Al, Nd, Ag, Ti, Ta, Mo, Cr, MoW, Cu and a combination thereof. The gate line 110 may be formed to have a single-layered structure, or in alternative exemplary embodiments it may have a multiple-layered structure formed by laminating the above metals. Although the gate line 110 having a straight line form is illustrated in this exemplary embodiment, it is not limited thereto. That is, a portion of the gate line 110 may be bent. Further, the data lines 130, the source electrodes 131, the drain electrodes 132 and the storage electrode portions 140 may be formed of substantially the same material as the aforementioned material of the gate lines 110, and may be formed to have a single- or multiple-layered structure. In the current exemplary embodiment, it has been described that the ohmic contact and active layers 123 and 122 are formed under the source and drain electrodes 131 and 132. However, the present invention is not limited thereto. That is, alternative exemplary embodiments include configurations wherein the ohmic contact and active layers 123 and 122 may be positioned under the data lines 130 and the storage electrode portions 140. In other words, the data lines 130, the storage electrode portions 140, the ohmic contact layers 123 and the active layers 122 may be formed by being simultaneously patterned.

A protection film 150 is formed on top of the data lines 130, the TFTs 120 and the storage electrode portions 140, and the substrate 100 not covered thereby. In one exemplary embodiment an inorganic insulation material, or an organic insulation material such as resin may be used as the protection film 150. Further, a contact hole 151 for exposing each drain electrode 132 is formed in the protection film 150.

A pixel electrode 160 partially overlapping with the storage electrode portion 140 is formed on the protection film 150. In one exemplary embodiment the pixel electrodes 160 are formed by patterning a third conductive layer, exemplary embodiments of which include indium tin oxide ("ITO") or indium zinc oxide ("IZO"). The pixel electrode 160 is connected to the drain electrode 132 of the TFT 120 through the contact hole 151.

In addition, although not shown, the pixel electrode 160 may be divided into a plurality of domains. The pixel electrode 160 may include a cut-away or protrusion pattern as a domain regulating means. Further, a micro concave-convex pattern for regulating the orientation of liquid crystal molecules in the domains may be formed on the pixel electrode 160.

Although not shown, a color filter substrate with a common electrode formed thereon may be positioned over the TFT substrate 100. The common electrode may correspond to the pixel electrode 160. Further, an LCD panel may be manufactured by forming a liquid crystal layer between the two substrates. At this time, a black matrix for preventing light leakage and color filters for displaying colors may be formed on the color filter substrate. Exemplary embodiments of the color filters include red, blue and green color filters. In such an exemplary embodiment, the red, blue and green color filters may be arranged to alternatively repeat in the horizontal direction.

Figure 4:
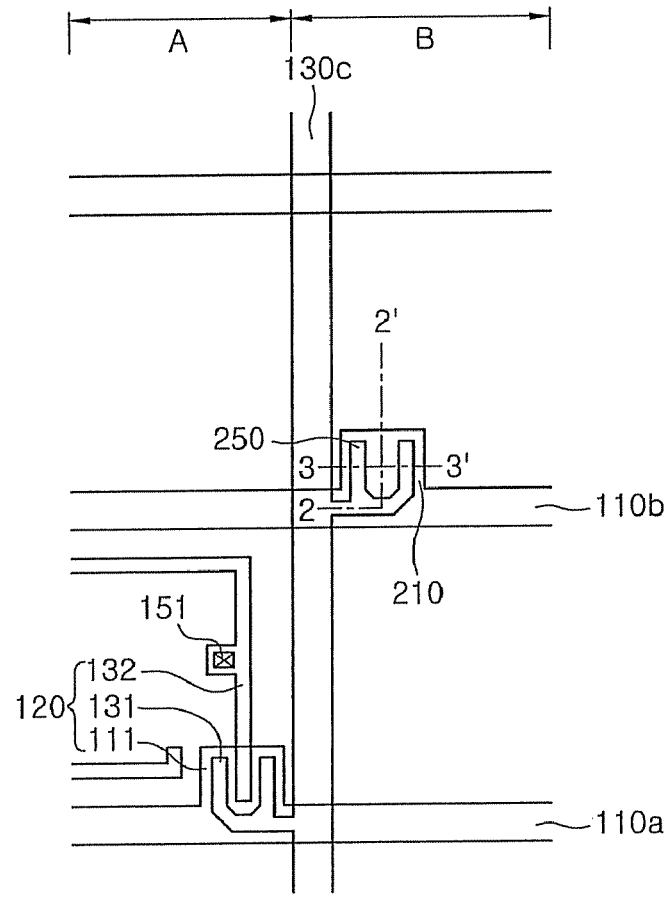
FIG. 4 is an enlarged top plan view layout showing a dummy region of an exemplary embodiment of a TFT substrate, on which a first exemplary embodiment of a dummy pattern according to the present invention is formed.
Figure 5:
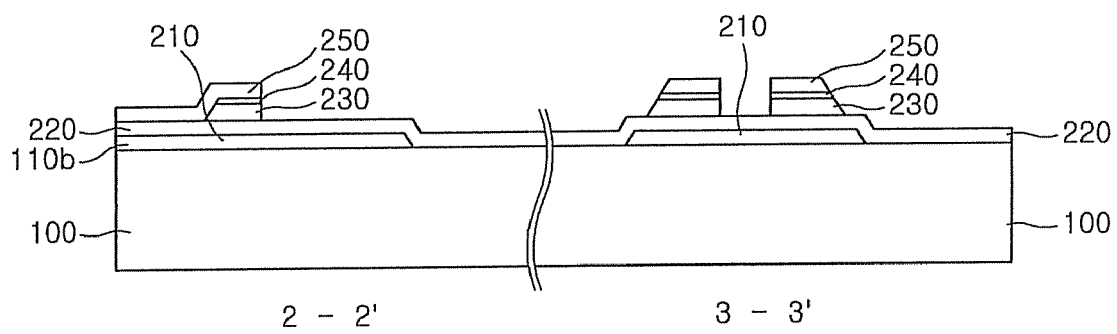
FIG. 5 is a cross-sectional view taken along lines 2-2' and 3-3' of FIG. 4.

FIG. 4 is an enlarged top plan view layout of a dummy region of an exemplary embodiment of a TFT substrate, on which a first exemplary embodiment of a dummy pattern according to the present invention is formed, and FIG. 5 is a cross-sectional view taken along lines 2-2' and 3-3' of FIG. 4.

Referring to FIGS. 4 and 5, the dummy pattern includes a lower electrode 210, an insulation film 220, an active layer 230, an ohmic contact layer 240 and an upper electrode 250. In one exemplary embodiment the lower electrode 210 is formed in the dummy region B substantially simultaneously when the gate electrode 111 is formed in the cell region A by patterning the first conductive layer. In the present exemplary embodiment the lower electrode 210 is formed into substantially the same pattern as the gate electrode 111. Further, in the present exemplary embodiment the insulation film 220 is formed of substantially the same material through substantially the same process as the gate insulation film 121 in the cell region A. The formation of the insulation film 220 may be limited to the top of the lower electrode 210, or it may be formed over substantially the entire the dummy region B. Further, in the present exemplary embodiment the active and ohmic contact layers 230 and 240 are formed of substantially the same material through substantially the same process as the active and ohmic contact layers 122 and 123 of the cell region (A). The formation of the active and ohmic contact layers 230 and 240 may be limited to beneath the upper electrode 250, or it may be formed over substantially the entire lower electrode 210, or it may be omitted. In one exemplary embodiment the upper electrode 250 is formed substantially simultaneously with the source electrode 131 in the cell region A by patterning the second conductive layer. In one exemplary embodiment the upper electrode 250 is formed into substantially the same pattern as the source electrode 131.

As described above, the dummy pattern is formed in the dummy region B outside the outermost data line 130c to have substantially the same pattern as the gate and source electrodes of the TFT formed in the cell region A. Accordingly, the dummy pattern can be formed without changing the shape of a mask or adding additional masks, and a difference of charging rates between the cell and dummy regions A and B can be compensated by varying the capacitance between the upper and lower electrodes 210 and 250 of the dummy pattern.

Figure 6:
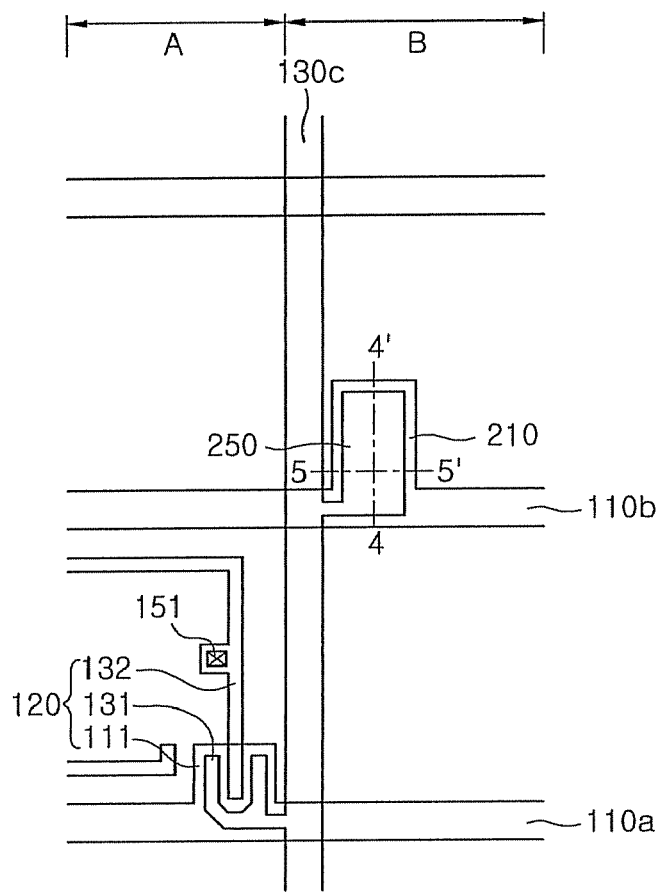
FIG. 6 is an enlarged top plan view layout of a dummy region of an exemplary embodiment of a TFT substrate, on which a second exemplary embodiment of a dummy pattern according to the present invention is formed.
Figure 7:
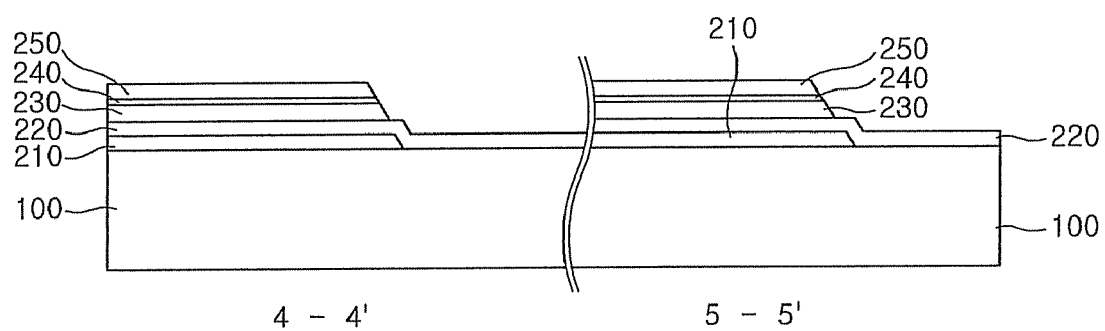
FIG. 7 is a cross-sectional view taken along lines 4-4' and 5-5' of FIG. 6.

FIG. 6 is an enlarged top plan view layout of a dummy region of an exemplary embodiment of a TFT substrate, on which a second exemplary embodiment of a dummy pattern according to the present invention is formed, and FIG. 7 is a cross-sectional view taken along lines 4-4' and 5-5' of FIG. 6.

Referring to FIGS. 6 and 7, the dummy pattern includes a lower electrode 210, an insulation film 220, an active layer 230, an ohmic contact layer 240 and an upper electrode 250. The second exemplary embodiment of a dummy pattern according to the present invention has electrodes which differ in shape from the first exemplary embodiment of a dummy pattern according to the present invention. That is, in the current exemplary embodiment the lower electrode 210 is formed in the shape of a rectangle, and the upper electrode 250 is also formed in the shape of a rectangle. An exemplary embodiment of a method of forming the second exemplary embodiment of a dummy pattern is substantially similar with that of the first exemplary embodiment.

As described above, the gate and source electrodes of the TFT formed in the cell region A are formed in the dummy region B outside the outermost data line 130c, and simultaneously, the lower and upper electrodes 210 and 250 in the rectangular shape are formed. Accordingly, a difference of charging rates between the cell and dummy regions A and B can be compensated by varying the capacitance between the upper and lower electrodes 210 and 250 of the dummy pattern. Further, the desired capacitance of the lower and upper electrodes 210 and 250 can be adjusted by changing the size of the lower and upper electrodes 210 and 250.

Figure 8:
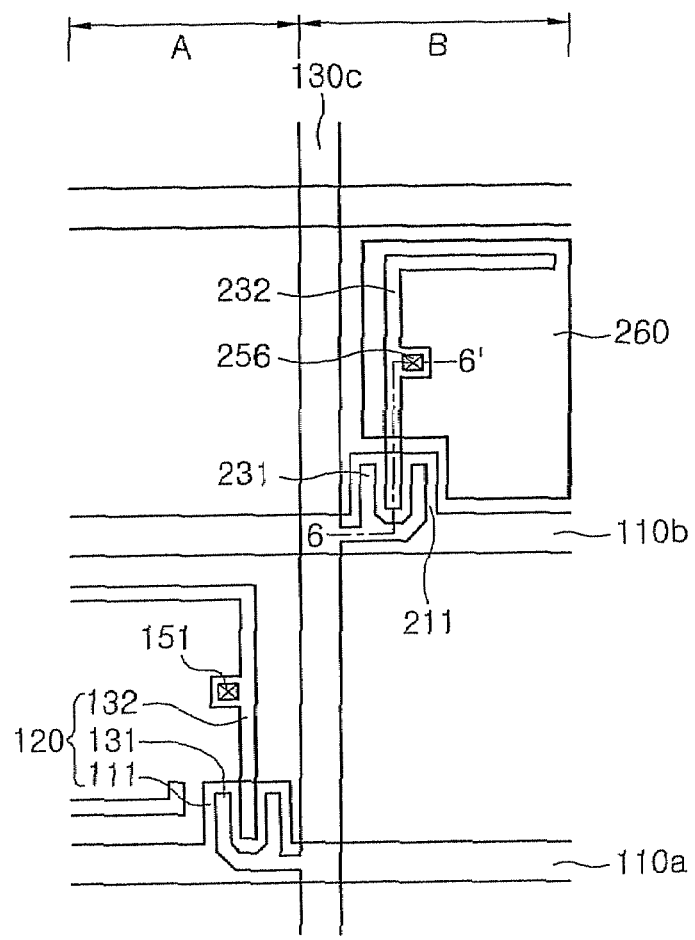
FIG. 8 is an enlarged top plan view layout of a dummy region of an exemplary embodiment of a TFT substrate, on which a third exemplary embodiment of a dummy pattern according to the present invention is formed.
Figure 9:
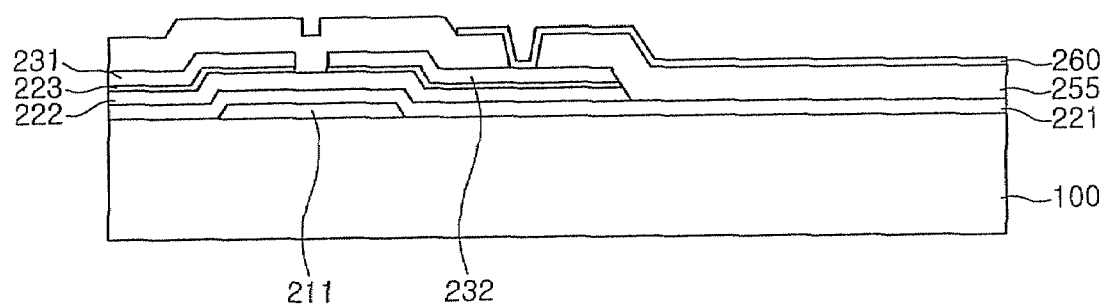
FIG. 9 is a cross-sectional view taken along line 6-6' of FIG. 8.

FIG. 8 is an enlarged top plan view layout of a dummy region of an exemplary embodiment of a TFT substrate, on which a third exemplary embodiment of a dummy pattern according to the present invention is formed, and FIG. 9 is a cross-sectional view taken along line 6-6' of FIG. 8.

Referring to FIGS. 8 and 9, the dummy pattern includes a dummy pixel electrode 260, and a dummy TFT, which has a dummy gate electrode 211, a dummy gate insulation film 221, a dummy active layer 222, a dummy ohmic contact layer 223, a dummy source electrode 231 and a dummy drain electrode 232. In one exemplary embodiment the dummy gate electrode 211 is formed in the dummy region B substantially simultaneously with the gate electrode 111, when the gate electrode 111 is formed in the cell region A by patterning the first conductive layer. In the current exemplary embodiment the dummy gate electrode 211 is formed into substantially the same pattern as the gate electrode 111. Further, in the current exemplary embodiment the dummy gate insulation film 221 is formed of substantially the same material through substantially the same process as the gate insulation film 121 formed in the cell region A. The formation of the dummy gate insulation film 221 may be limited to the top of the dummy gate electrode 211, or may be formed over substantially the entire dummy region B. In addition, the dummy active layer 222 and the dummy ohmic contact layer 223 may be formed using a semiconductor layer through substantially the same process as the active layer 122 and the ohmic contact layer 123 formed in the cell region A. The dummy source and dummy drain electrodes 231 and 232 may be formed in the dummy region B substantially simultaneously with the source and drain electrodes 131 and 132, which are formed in the cell region A, by patterning the second conductive layer.

In the current exemplary embodiment the dummy source and dummy drain electrodes 231 and 232 are formed into substantially the same pattern as the source and drain electrodes 131 and 132. In the current exemplary embodiment the dummy drain electrode 232 is formed to have an extension length shorter than that of the drain electrode 132. Further, in the current exemplary embodiment a protection film 255 is formed on substantially the entire top of the dummy region B including the dummy source and dummy drain electrodes 231 and 232. A contact hole 251 for exposing a predetermined region of the dummy drain electrode 232 is formed by etching a predetermined region of the protection film 255. The dummy pixel electrode 260 is formed to be connected to the dummy drain electrode 232 through the contact hole 256. The dummy pixel electrode 260 is formed in the dummy region B substantially simultaneously with the pixel electrode 160, which is formed in the cell region A, by patterning the third conductive layer. In the current exemplary embodiment the dummy pixel electrode 260 is formed to have a size smaller than that of the pixel electrode in the cell region A. One factor influencing the size of the dummy pixel electrode is the size of the dummy region B.

In the above described exemplary embodiment, the dummy pattern is formed to have the dummy TFT and the dummy pixel electrode. The dummy pattern is formed in such a manner so that a difference of charging rates between the cell and dummy regions A and B can be compensated for. Moreover, even various kinds of parasitic capacitances formed from the outside can be identical with each other in the cell and dummy regions A and B, respectively.

In addition, since the dummy pattern having the dummy TFT and the dummy pixel electrode is not intended to control the liquid crystal layer but is instead formed to compensate for capacitance, the dummy pattern does not take up much space. Further, exemplary embodiments include configurations wherein the black matrix, formed on the color filter substrate for preventing light leakage, is formed to partially overlap with the outermost pixels. Since in the current exemplary embodiment a pixel is formed to be elongated in the horizontal direction, loss of a display region is inevitable when the whole of the pixel or a portion thereof overlaps with the color filter substrate. However, if the black matrix is formed to overlap with the dummy pattern by adding the dummy pattern, a sufficient space overlapping with the black matrix can be ensured without the loss of display area.

Figure 10:
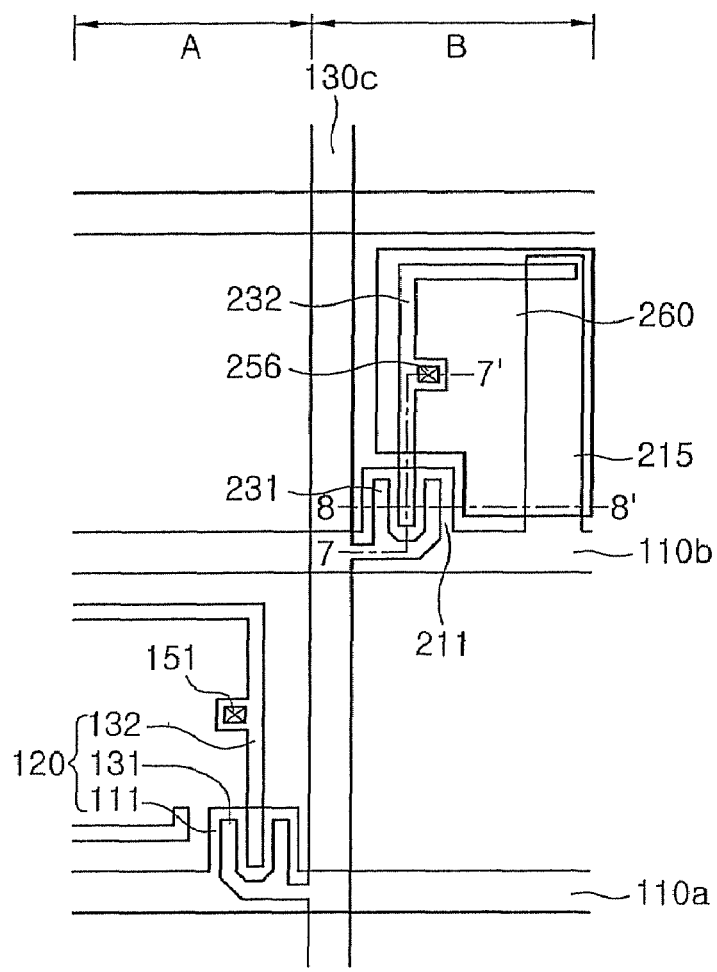
FIG. 10 is an enlarged top plan view layout of a dummy region of an exemplary embodiment of a TFT substrate, on which a fourth exemplary embodiment of a dummy pattern according to the present invention is formed.
Figure 11:
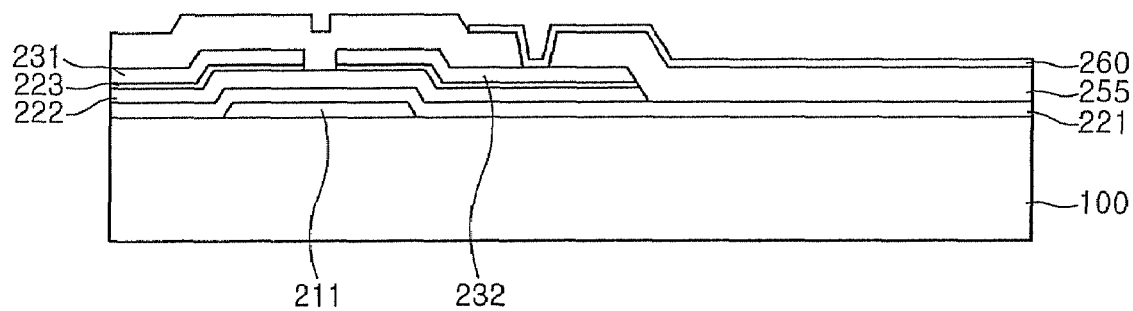
FIGS. 11 and 12 are cross-sectional views taken along lines 7-7' and 8-8' in FIG. 10, respectively.
Figure 12:
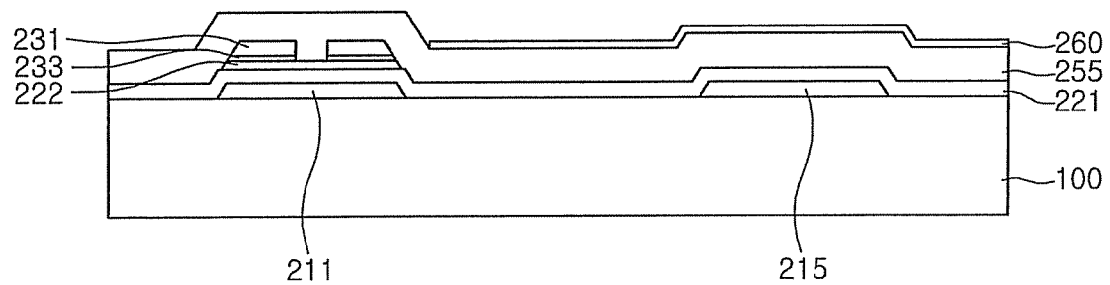

FIG. 10 is an enlarged top plan view layout of a dummy region of an exemplary embodiment of a TFT substrate, on which a fourth exemplary embodiment of a dummy pattern according to the present invention is formed, FIG. 11 is a cross-sectional view taken along line 7-7' in FIG. 10, and FIG. 12 is a cross-sectional view taken along line 8-8' in FIG. 10.

Referring to FIGS. 10 to 12, the dummy pattern includes a dummy gate electrode 211, a dummy storage electrode 215, a dummy insulation film 221, a dummy active layer 222, a dummy ohmic contact layer 223, a dummy source electrode 231, a dummy drain electrode 232 and a dummy pixel electrode 260. The fourth exemplary embodiment of a dummy pattern according to the present invention is substantially similar to the third exemplary embodiment of a dummy pattern except the fourth exemplary embodiment further includes the dummy storage electrode 215 in the dummy pattern. In one exemplary embodiment the dummy storage electrode 215 is formed in the dummy region B substantially simultaneously with the gate electrode 111, which is formed in the cell region A, by patterning the first conductive layer.

Further, in the present exemplary embodiment the dummy storage electrode 215 is formed to have a larger size than that of the dummy gate electrode 211. The other components are substantially identical with those of the third exemplary embodiment described above.

In the aforementioned fourth exemplary embodiment of the present invention, the dummy storage electrode 215, the dummy pixel electrode 260 and the protection film 255 therebetween forms a storage capacitor. In one exemplary embodiment the size of the dummy pattern may be set to be substantially identical with that of a pixel region. In such an exemplary embodiment the capacitance of the liquid crystal capacitor Clc and the storage capacitor Cst in the dummy pattern can be identical with those in the pixel region. However, in such an exemplary embodiment a space occupied by the dummy pattern is increased. In order for the capacitance of the liquid crystal and storage capacitors Clc and Cst in the dummy pattern to be substantially identical with those in the pixel region while minimizing the space occupied by the dummy pattern, the capacitance of the storage capacitor Cst may be increased. Thus, the storage capacitor Cst is formed in the dummy pattern by forming the dummy storage electrode 215. As a result, various capacitances generated in the pixel of the cell region A can be almost identically mimicked in the dummy pattern.

As described above, according to exemplary embodiments of the present invention, the dummy pattern is formed in the dummy regions in which the outermost data lines are not connected to a pixel, so that the charging rate of the outermost data lines having pixels at only one side thereof can be maintained to be substantially identical with that of the other data lines having pixels at both sides thereof. Accordingly, the output deviation of the data lines can be reduced, and display failure of the outermost pixels can be prevented.

While the present invention has been illustrated and described in connection with the accompanying drawings and exemplary embodiments thereof, the present invention is not limited thereto and is defined by the appended claims. Therefore, it will be understood by those skilled in the art that various modifications and changes can be made thereto without departing from the spirit and scope of the invention defined by the appended claims.

What is claimed is:

1. A thin film transistor substrate, comprising:
   a substrate;
   a plurality of gate lines disposed on the substrate;
   a plurality of data lines disposed substantially perpendicular to the gate lines, wherein the plurality of data lines include a plurality of outermost data lines;
   a plurality of thin film transistors connected to the gate lines and the data lines;
   a plurality of pixel electrodes connected to the plurality of thin film transistors; and
   a plurality of dummy patterns connected to the outermost data lines in a zigzag pattern.

2. The thin film transistor substrate as claimed in claim 1, wherein the pixel electrode comprises a first side substantially parallel with the gate line and a second side which is oblique or perpendicular to the gate line, wherein the first side is longer than the second side.

3. The thin film transistor substrate as claimed in claim 1, wherein the dummy pattern comprises:
   a lower electrode extending from the gate line;
   an insulation film disposed on the lower electrode; and
   an upper electrode disposed on the insulation film, wherein the upper electrode at least partially overlaps the lower electrode and extends from the outermost data line.

4. The thin film transistor substrate as claimed in claim 1, wherein the dummy pattern comprises dummy thin film transistors and dummy pixel electrodes.

5. The thin film transistor substrate as claimed in claim 4, wherein the dummy pattern flirt her comprises a dummy storage electrode.

6. The thin film transistor substrate as claimed in claim 1, wherein the outermost data lines are adjacent to only one other data line of the plurality of data lines.

7. The thin film transistor substrate as claimed in claim 6, wherein the dummy patterns are connected to a side of the outermost data lines which is opposite the side of the outermost data line adjacent to another data line.

8. The thin film transistor substrate as claimed in claim 1, wherein the substrate includes a display region and a non-display region and the dummy patterns are disposed in the non-display region.

9. The thin film transistor substrate as claimed in claim 1, wherein the plurality of dummy patterns are each connected to a same side of a respective outermost data line of the outermost data lines, and the dummy patterns are disposed in an alternating pattern relative to the outermost data lines and succession of the plurality of gates lines.

10. A thin film transistor substrate, comprising:
a substrate;
a plurality of gate lines disposed on the substrate;
a plurality of data lines disposed substantially perpendicular to the gate lines, wherein the plurality of data lines include a plurality of outermost data lines adjacent to only one other data line of the plurality of data lines;
a plurality of thin film transistors, wherein a plurality of the thin film transistors is connected to each data line, and the thin film transistors are connected to alternating sides of the data lines along a length of the data lines, and each of the thin film transistors includes a gate electrode, a source electrode and a drain electrode;
a plurality of pixel electrodes connected to the plurality of thin film transistors; and
a plurality of dummy patterns connected to the outermost data lines in a zigzag pattern.

11. The thin film transistor substrate as claimed in claim 10, wherein the plurality of dummy patterns are each connected to a same side of a respective outermost data line of the outermost data lines, and the dummy patterns are disposed in an alternating pattern relative to the outermost data lines and succession of the plurality of gates lines.

12. The thin film transistor substrate as claimed in claim 10, wherein the dummy pattern comprises:
a lower electrode extending from the gate line;
an insulation film disposed on the lower electrode; and
an upper electrode disposed on the insulation film,
wherein the upper electrode at least partially overlaps the lower electrode and extends from the outermost data line.

13. The thin film transistor substrate as claimed in claim 12, wherein the lower electrode is substantially the same shape as the gate electrode, and the upper electrode is substantially the same shape as the source electrode.

14. The thin film transistor substrate as claimed in claim 12, wherein the lower electrode is larger than the gate electrode, and the upper electrode is larger than the source electrode.

15. The thin film transistor substrate as claimed in claim 10, wherein the dummy pattern comprises:

a dummy gate electrode;
a dummy gate insulation film and a dummy active layer disposed on the dummy gate electrode;
a dummy source electrode disposed on the dummy active layer and at least partially overlapping the dummy gate electrode;
a dummy drain electrode spaced apart from the dummy source electrode by a predetermined interval and at least partially overlapping the dummy gate electrode;
a protection film including a contact hole which at least partially exposes the dummy drain electrode; and
a dummy pixel electrode connected to the dummy drain electrode through the contact hole.

16. The thin film transistor substrate as claimed in claim 15, wherein the dummy gate electrode has substantially the same shape as the gate electrode, and the dummy source electrode has substantially the same shape as the source electrode, and wherein the dummy drain electrode is smaller than the drain electrode, and the dummy pixel electrode is smaller than the pixel electrode.

17. The thin film transistor substrate as claimed in claim 9, wherein the dummy pattern comprises:
a dummy gate electrode and a dummy storage electrode spaced apart from each other by a predetermined interval;
a dummy gate insulation film and a dummy active layer disposed on the dummy gate electrode;
a dummy source electrode disposed on the dummy active layer and at least partially overlapping the dummy gate electrode;
a dummy drain electrode spaced apart from the dummy source electrode by a predetermined interval and at least partially overlapping the dummy gate electrode;
a protection film including a contact hole which at least partially exposes the dummy drain electrode; and
a dummy pixel electrode connected to the dummy drain electrode through the contact hole.

18. The thin film transistor substrate as claimed in claim 17, wherein the dummy gate electrode has substantially the same shape as the gate electrode, and the dummy source electrode has substantially the same shape as the source electrode, and wherein the dummy drain electrode is smaller than the drain electrode, and the dummy pixel electrode is smaller than the pixel electrode.

19. The thin film transistor substrate as claimed in claim 10, wherein the plurality of dummy patterns are connected to a side of the outermost data lines which is substantially opposite the side adjacent to another data line.

20. The thin film transistor substrate as claimed in claim 19, wherein the plurality of dummy patterns are alternatingly disposed along an axis of the substrate.

21. A liquid crystal display, comprising:
a thin film transistor substrate comprising:
a substrate;
a plurality of gate lines disposed on the substrate;
a plurality of data lines disposed substantially perpendicular to the gate lines, wherein the plurality of data lines include a plurality of outermost data lines adjacent to only one other data line of the plurality of data lines;
a plurality of thin film transistors, wherein a plurality of the thin film transistors are connected to each data line, the thin film transistors are connected to alternating sides of the data lines along a length of the data lines;
a plurality of pixel electrodes connected to the plurality of thin film transistors; and
a plurality of dummy patterns connected to the outermost data lines in a zigzag pattern;

a color filter substrate including a color filter and a common electrode corresponding to the thin film transistor substrate; and a liquid crystal layer interposed between the thin film transistor substrate and the color filter substrate.

22. A method for manufacturing a thin film transistor substrate, the method comprising:

providing a substrate;

disposing a plurality of gate lines on the substrate;

disposing a plurality of data lines substantially perpendicular to the gate lines on the substrate, wherein the plurality of data lines include a plurality of outermost data lines;

connecting a plurality of thin film transistors to the gate lines and the data lines;

connecting a plurality of pixel electrodes to the plurality of thin film transistors; and connecting a plurality of dummy patterns to the outermost data lines in a zigzag pattern.

23. The method for manufacturing a thin film transistor substrate as claimed in claim 22, wherein the plurality of dummy patterns are each connected to a same side of a respective outermost data line of the outermost data lines, and the dummy patterns are disposed in an alternating pattern relative to the outermost data lines and succession of the plurality of gates lines.

* * * * *